US010655936B2

(12) United States Patent
Ginsberg et al.

(10) Patent No.: US 10,655,936 B2
(45) Date of Patent: May 19, 2020

(54) COORDINATING MULTIPLE MISSILE TARGETING VIA OPTICAL INTER-MISSILE COMMUNICATIONS

(71) Applicant: Rosemount Aerospace Inc., Burnsville, MN (US)

(72) Inventors: David Ginsberg, Granby, CT (US); William A. Veronesi, Hartford, CT (US); Joseph V. Mantese, Ellington, CT (US); Todd Ell, Savage, MN (US); Martin Krucinski, Glastonbury, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 230 days.

(21) Appl. No.: 15/337,932

(22) Filed: Oct. 28, 2016

(65) Prior Publication Data

US 2018/0209764 A1 Jul. 26, 2018

(51) Int. Cl.
*F41G 7/22* (2006.01)
*G05D 1/12* (2006.01)
*G01S 17/89* (2020.01)
*G01S 7/481* (2006.01)

(52) U.S. Cl.
CPC .......... *F41G 7/2233* (2013.01); *F41G 7/226* (2013.01); *F41G 7/2246* (2013.01); *F41G 7/2293* (2013.01); *G01S 7/4815* (2013.01); *G01S 17/89* (2013.01); *G05D 1/12* (2013.01)

(58) Field of Classification Search
CPC ........ F41G 3/145; F41G 7/226; F41G 7/2233; F41G 7/2246; F41G 7/2293; G01S 7/481; G01S 7/4802; G01S 7/4815; G01S 17/89; G05D 1/12

USPC .................................................. 235/400–418
See application file for complete search history.

(56) References Cited

U.S. PATENT DOCUMENTS

| 5,601,255 A | 2/1997 | Romer et al. |
| 5,893,085 A * | 4/1999 | Phillips ................. G01S 7/4802 706/50 |
| 7,121,502 B2 | 10/2006 | Krikorian et al. |
| 7,947,936 B1 | 5/2011 | Bobinchak et al. |
| 8,748,787 B2 | 6/2014 | Weiss et al. |
| 2005/0068517 A1 * | 3/2005 | Evans ..................... G01S 7/481 356/5.01 |

(Continued)

*Primary Examiner* — Daniel A Hess
(74) *Attorney, Agent, or Firm* — Kinney & Lange, P.A.

(57) ABSTRACT

Apparatus and associated methods relate to coordinating guided-missile targeting among multiple guided missiles using inter-missile optical communications. An inter-missile communications channel is optically established with a first guided missile illuminating a first target within a scene aligned along a first missile axis, and a second guided missile receiving the illumination reflected by the first target. By illuminating the first target within the scene, the first guided missile designates the first target. The second guided missile can be configured to navigate to the designated first target or to select a second target not designated by the first guided missile. In some embodiments, the second guided missile can be configured to illuminate its selected second target so as to designate the selected second target and to communicate the designation to other guided missiles. By facilitating communications among a plurality of guided missiles, missile targeting can be coordinated during a flight portion of a guided-missile operation.

20 Claims, 5 Drawing Sheets

(56) References Cited

U.S. PATENT DOCUMENTS

2009/0228159 A1* 9/2009 Flowers ................. F41G 7/226
                                                        701/3
2016/0123705 A1* 5/2016 Bowden-Peters ....... F41G 3/145
                                                       244/3.16
2016/0370149 A1* 12/2016 Andorn ................... F41G 3/145

* cited by examiner

COORDINATING MULTIPLE MISSILE TARGETING VIA OPTICAL INTER-MISSILE COMMUNICATIONS

BACKGROUND

Semi-Active Laser (SAL) guided missile systems are used when destruction of a specific target requires precision. In some cases, such precision is needed to minimize collateral damage. In some cases, such precision is desired to ensure that a high-value target is successfully destroyed.

The principle of operation of SAL guided missile systems is to "paint" or designate a target with a signal that is perceivable by a missile. A system called a seeker is responsible for perceiving the signal reflected by the designated target. A forward-positioned operator may paint the desired target using a Laser Target Designator (LTD), for example. An LTD can have a Short-Wave Infrared Radiation (SWIR) laser to illuminate or paint the target. In some embodiments, the illumination signal is encoded with an identifying signal corresponding to the specific LTD providing the illumination. The illumination signal can be detected, however, by persons or systems nearby, thereby exposing the forward-positioned operator.

The seeker of the SAL guided missile can be equipped with a SWIR detector, which can be configured to detect SWIR signals and to determine whether the detected SWIR signals are encoded with the identifying signal corresponding to the LTD to which the guided missile is paired. If the SWIR detector determines that the detected SWIR signals are encoded with the signature of the paired LTD, then the target from which the detected signal is reflected is deemed to have been designated by the paired LTD. The seeker then can sense this reflected designation signal and also can determine the direction of the designated target relative to the guided missile. The seeker may output a signal indicative of the determined direction for use by a guidance system on the missile. The missile's guidance system then can direct the missile to the designated target.

Some seekers also can have a passive Image InfraRed (IIR) target location system. Such seekers are sometimes called dual-mode seekers. The passive IIR target locator can include an infrared camera to capture images of a scene that includes the target designated by the LTD. Image features corresponding to the designated target can be identified. Image coordinates of the identified features within the captured images can be used to determine the direction of the target relative to the missile. The signal strength of the ambient infrared light emitted from and/or reflected by the imaged scene can be much lower than the signal strength of the pulsed laser signal generated by an LTD and reflected by the target. Thus, target detection and location using an IIR-mode of operation can be performed when the range between the target and missile is relatively close. For long-range target detection and location, SAL-mode operation can be better used, due to the relatively high signal strength of the LTD laser signal.

A dual-mode guided missile can be launched by a launching vehicle that is located a great distance from a desired target. The dual-mode seeker of such a launched missile might first acquire a target using the SAL-mode of target detection and location, due to the relatively large signal strength of the LTD laser signal. When the range to the designated target closes to a distance at which the passive IIR-mode of target detection and location can be used, the seeker can switch modes to the IIR-mode of operation.

Often more than one guided missile may be deployed at the same time. Coordinating the targeting of multiple targets and multiple guided missiles can be problematic. Coordinating multiple targets can involve multiple forward-positioned operators, each of whom incurs a risk of being detected. In some cases, two or more passively guided missiles may redundantly select the same target, unnecessarily wasting military assets.

SUMMARY

Apparatus and associated devices relate to a system for facilitating communications between guided missiles. The system includes an optical imaging system configured to generate an image of a scene aligned with a missile axis. The image includes a two-dimensional array of pixel data. The system includes a controller including a target identifier configured to identify one or more image portions within the image as corresponding to one or more potential targets in the aligned scene. The controller includes a target selector configure to select one of the one or more identified image portions. The selected one of the one or more identified image portions corresponding to a selected target within the aligned scene. The system includes an optical emitter configured to illuminate the selected target thereby communicating, to other missiles equipped to detect the target illumination, that the selected target has been designated.

Some embodiments relate to a seeker for a Semi-Active Laser (SAL) guided missile. The seeker includes a Short-Wave Infra-Red (SWIR) camera. The SWIR camera includes a focal plane array having an imaging region comprising a plurality of pixels. The SWIR camera also includes an optical lens stack configured to receive SWIR light from a scene aligned along a missile axis of the optical lens stack. The SWIR camera is further configured to focus at least a portion of the received SWIR light onto the imaging region of the focal plane array thereby forming an image of the aligned scene. The image includes pixel intensity data generated by the plurality of pixels. The seeker includes a controller. The controller includes a designation detector configured to determine a portion of the image corresponding to a target in the aligned scene that has been designated via illumination by a Laser Target Designator (LTD). The controller includes a navigation calculator configured to determine, based on the determined portion of the image, a direction of the designated target relative to the missile axis. The controller also includes a signal generator configured to generate an output signal indicative of the direction of the designated target relative to the missile axis.

Some embodiments relate to a method for facilitating communications between guided missiles. The method includes capturing an image of a scene aligned with a missile axis. The method includes identifying one or more image portions within the captured image, the identified one or more image portions corresponding to one or more potential targets in the aligned scene. The method includes selecting one of the one or more identified image portions. The selected one of the one or more identified image portions corresponds to a selected target within the aligned scene. The method also includes illuminating the selected target thereby communicating, to other missiles equipped to detect the target illumination, that the selected target has been designated.

DETAILED DESCRIPTION

Apparatus and associated methods relate to coordinating guided-missile targeting among multiple guided missiles using inter-missile optical communications. The term 'missile' can refer to missiles, projectiles, munitions, ordnances, or any type of airborne weapon. An inter-missile communications channel is optically established with a first guided missile illuminating a first target within a scene aligned along a first missile axis, and a second guided missile receiving the illumination reflected by the first target. By illuminating the first target within the scene, the first guided missile designates the first target as being the target to which the first guided missile navigates. The second guided missile can be configured to navigate to the designated first target or to select a second target not designated by the first guided missile. In some embodiments, the second guided missile can be configured to illuminate its selected second target so as to designate the selected second target and to communicate the designation to other guided missiles. By facilitating communications among a plurality of guided missiles, missile targeting can be coordinated during a flight portion of a guided-missile operation.

Figure 1:
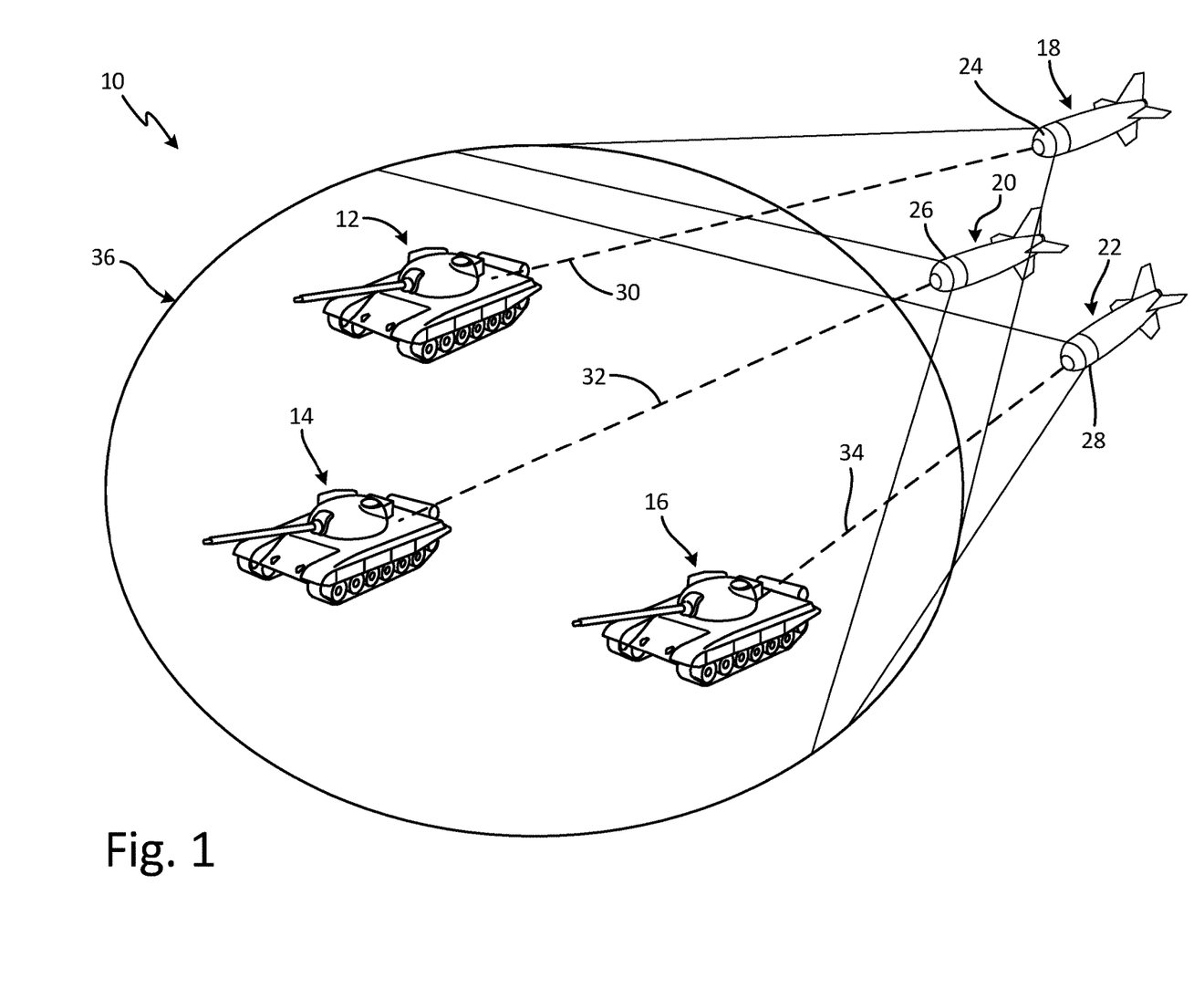
FIG. 1 is a schematic diagram of an exemplary scenario in which inter-missile communications are used to coordinate missile targeting.

FIG. 1 is a schematic diagram of an exemplary scenario in which inter-missile communications are used to coordinate missile targeting. In FIG. 1, battle arena 10 includes tanks 12, 14, 16. Guided missiles 18, 20, and 22 have been deployed to seek and/or destroy tanks 12, 14, and 16. Each of guided missiles 18, 20, and 22 includes seeker 24, 26, 28, respectively, having inter-missile communications capability. Seeker 24 of guided missile 18 is depicted illuminating tank 12 with illumination signal 30, thereby designating tank 12 as a target of guided missile 18. Seeker 26 of guided missile 20 is depicted illuminating tank 14 with illumination signal 32, thereby designating tank 14 as a target of guided missile 20. Seeker 28 of guided missile 22 is depicted illuminating tank 16 with illumination signal 34, thereby designating tank 16 as a target of guided missile 22.

Each of seekers 24, 26, and 28 is configured to capture images of scene 36, which includes tanks 12, 14, and 16. The images captured by each of seekers 24, 26, and 28 can include illumination signals 30, 32, and 34 reflected by tanks 12, 14, and 16, respectively. Seekers 24, 26, and 28 have encoded illumination signals 30, 32, and 34, with information that identifies and/or communicates those illumination signals 30, 32, and 34 correspond to seekers 24, 26, and 28, respectively. For example, seeker 24 has encoded illumination signal 30 such that seekers 26 and 28 can identify that seeker 24 is the source of illumination signal 30. Thus, when seekers 26 and 28 capture images of scene 36, which include illumination signals 32 and 34 reflected by tanks 14 and 16, respectively, seekers 26 and 28 can identify tanks 12 as having been designated by seeker 24.

Various methods of encoding illumination signals 30, 32, and 34 can be employed in various embodiments. For example, in some embodiments, each of illumination signals 30, 32 and 34 can be pulse code modulated in a manner unique one from another. The pulse code modulation method can be coordinated with a frame rate that seekers 24, 26, and 28 capture images, for example.

In addition to encoding illumination signals with source identification information, other information can be encoded into illumination signals 30, 32, and 34. For example, illumination signals can be used to coordinate timing of arrival of guided missiles 18, 20, and 22. In some embodiments, multiple guided missiles may coordinate a simultaneous attack on a single target. For example, illumination signals can be used to coordinate relative positions with respect to the target where each of the multiple missiles will explode (e.g., North, West, South, and East of the target). Illumination signals can be used to coordinate altitudes of detonation of each of multiple missiles, for example. In some embodiments, seekers 24, 26, and 28 can encode assessed target values to communicate to other seekers. For example, a seeker can solicit one or more other seekers to join its pursuit of a high value target in a swarm manner. Conversely, a seeker can communicate that a designated target is a friendly asset that should not be harmed.

Figure 2:
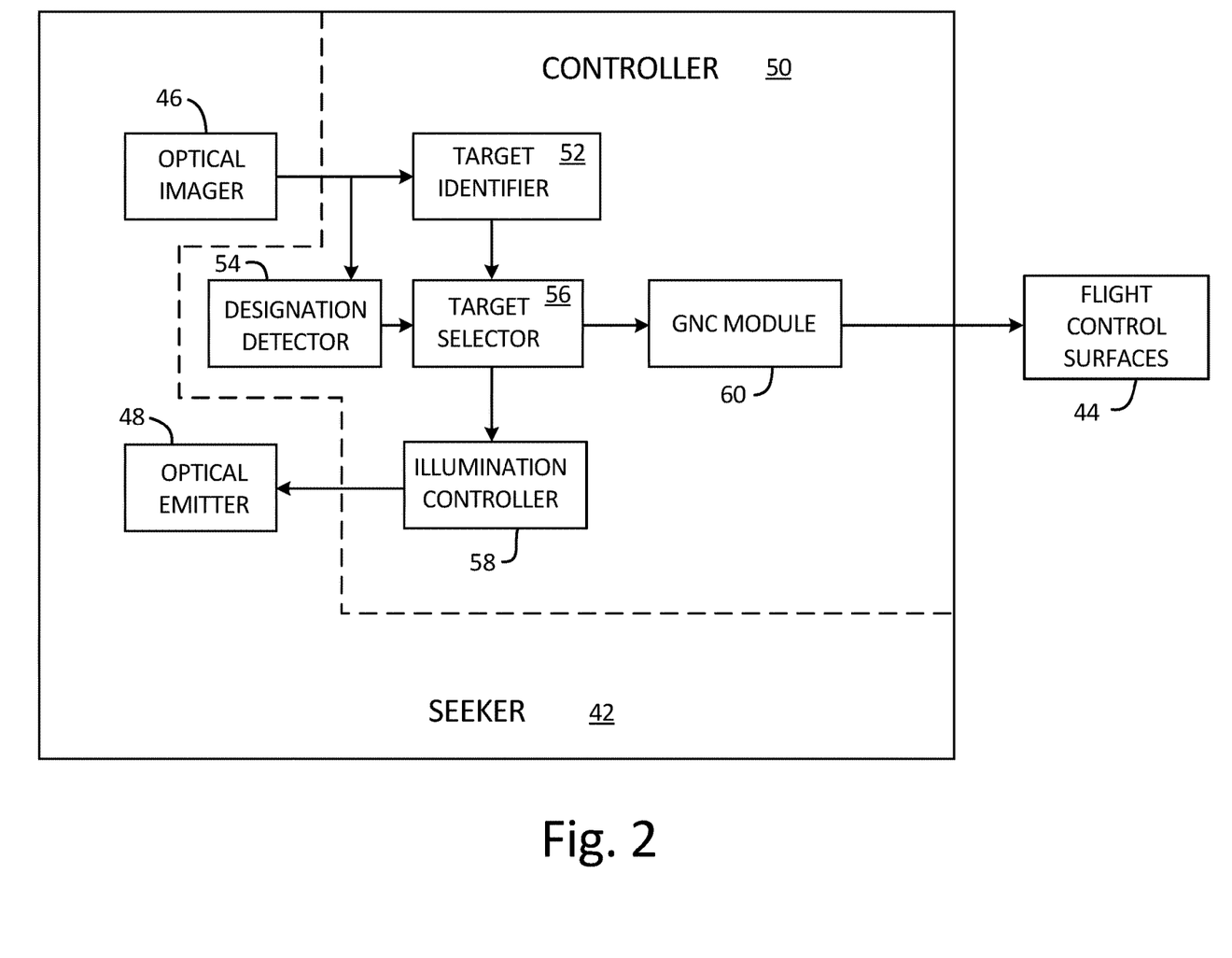
FIG. 2 is a block diagram of an exemplary guided missile having a seeker equipped with inter-missile communications capabilities.

FIG. 2 is a block diagram of an exemplary guided missile having a seeker equipped with inter-missile communications capabilities. In FIG. 2, guided missile 40 includes seeker 42 and flight control surfaces 44. Seeker 42 includes optical imager 46, optical emitter 48, and controller 50. Optical imager 46 can be configured to capture images aligned with a missile axis, for example. Optical imager 46 sends the captured images to controller 50 for image processing. Controller 50 includes target identifier 52, Designation detector 54, target selector 56, illumination controller 58, and Guidance, Navigation and Control (GNC) module 60. Target identifier 52 receives the images captured by optical imager 46 and performs operations to identify portions of the captured images that correspond to targets. For example, within a captured image, target identifier 52 can identify a first contiguous region of pixels upon which a tank is imaged, and a second contiguous region of pixels upon which a truck is imaged. Target identifier 52 can use imaged features that pertain to various potential targets to identify regions of pixels corresponding to potential targets and/or the kind of potential target imaged at the identified image regions.

Designation detector 54 also receives the images captured by optical imager 46 and performs operations to identify pixel locations corresponding to illumination signals designating targets. For example, designation detector 54 might detect an illumination signal centered at a pixel location that is within or near the first contiguous region of pixels upon which the tank is imaged. Designation detector 54 might detect encoded information within the detected illumination signal and decode such encoded information. For example, the decoded designation signal might indicate that the illumination signal originated from a specific seeker corresponding to another guided missile. Designation detector might, for example, detect no illumination signal corresponding to the second contiguous region of pixels upon which the truck is imaged, indicating that the truck has not been designated by a seeker of a guided missile.

Various embodiments employ various methods of identifying pixel locations corresponding to illumination signals designating targets. For example, a time-sequence of images can be captured by optical imager 46. Each of the images in the time-sequence of images can be compared with images captured prior to and/or after the image being compared. If necessary, the images being compared can be warped such that the objects imaged within each of the captured images are translated (or rotated or skewed) into the same pixel coordinates for each image being compared. A difference image can be computed between two images being compared. If the difference image includes a signature of an illumination signal, a location of that signature can be identified. Such an illumination signal can result from one of the images having increased localized light intensity compared with another image to which it is compared. In some embodiments, image locations that have amplitude greater than a predetermined threshold can be used to identify locations of target designation.

Target identifier 52 send a signal to target selector 56. The signal can be indicative of the pixel coordinates corresponding to identified regions of the captured images that correspond to potential targets. The signal can be indicative of the type of target identified at the indicated pixel coordinates. Designation detector 54 sends signals indicative of both the location of detected illumination signals and encoded information, if any, to target selector 56. Target selector 56 selects a target corresponding to one of the identified targets, based on the signals received from target identifier 52 and designation detector 54.

Target selector sends a signal indicative of the location of the selected target to illumination controller 58 and to GNC module 60. Illumination controller 58 generates a signal that controls optical emitter 48. The signal sent to optical emitter 48, can, for example, direct an optical beam in a predetermined direction with respect to the missile axis. In some embodiments, the signal sent to optical emitter 48 can include encoded information so that other seekers can decode the encoded information. Optical emitter 48 generates an illumination signal with encoded information, based upon the received signal from illumination controller 58.

GNC module 60 receives the signal indicative of the location of the selected target from target selector 56 and generates signals to guide missile 40 to the selected target. GNC module 60, for example, can generate signals that affect an orientation of various flight control surfaces of missile 40. For example, fin motors can orient fins of missile 40 such that missile 40 is directed toward the selected target. Various ordnances can have various other means of controlling ordnance flight trajectory.

Various embodiments can use various types of optical imager 46 and/or optical emitter 48. For example, in some embodiments optical imaging can be performed using a lens stack and a focal plane array. In some embodiments, a laser and/or a diode can be used as an optical emitter. In some embodiments optical imaging and/or optical emitting can be performed using a LIDAR system. Some embodiments can use LIDAR systems in combination with other imaging systems and/or with other light emitting systems.

Figure 3:
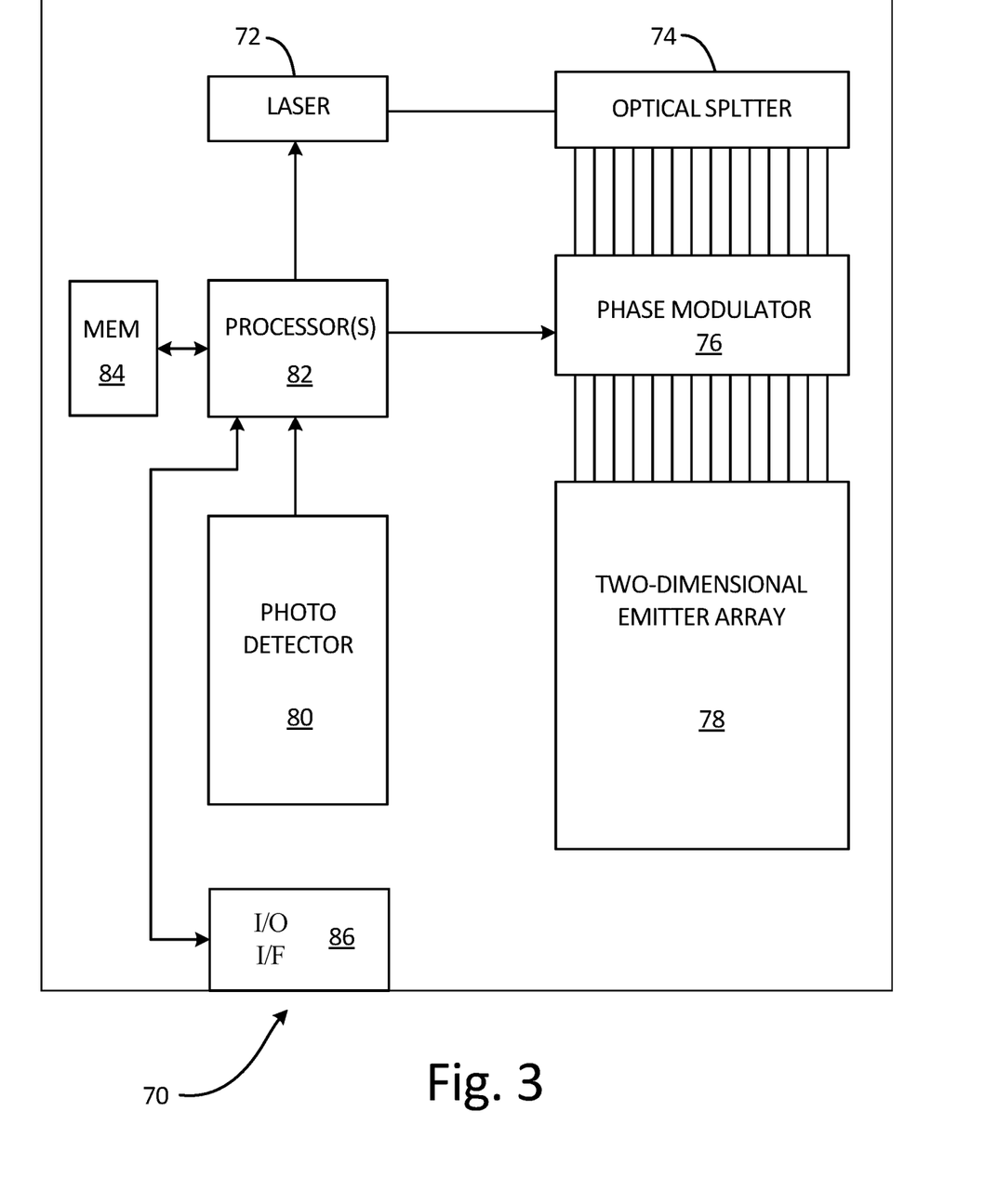
FIG. 3 is a block diagram of a LIDAR system for use in a seeker configured for inter-missile communications.

FIG. 3 is a block diagram of a LIDAR system for use in a seeker configured for inter-missile communications. In some embodiments, such a LIDAR system can be used in conjunction with an imaging system. In some embodiments, the LIDAR system can be used to image the scene aligned with an optical axis of the imager. In such embodiments, the LIDAR system can employ directional signal detection, using a focal plane array and/or a quadrature detector. In FIG. 3, LIDAR system 70 includes laser 72, optical splitter 74, phase modulators 76, two-dimensional array of optical emitters 78, and photodetector 80. Processor(s) 82 is electrically connected to laser 72, phase modulators 76 and photodetector 80. Processor(s) 82 controls the laser's generation of pulses of coherent light as well as coordinating the phases of the portions of the generated pulses emitted by the two-dimensional array of optical emitters 66, so as to control a beam direction of light emitted by the two-dimensional array of optical emitters 66. Processor(s) 82 receive signals indicative of the beam reflected from ground surface 20 as sensed by photodetector 80. Processor(s) 82 is also in electrical communication with memory 84 and Input/Output (I/O) Interface (I/F) 74.

As illustrated in FIG. 3, LIDAR system 70 includes optical elements 74 and 78, opto-electrical elements 72, 76 and 80, electronic components 84 and 86, and processor(s) 82. However, in certain examples, LIDAR system 70 can include more or fewer components. For example, some embodiments, can include additional or fewer optical elements, such as lasers, and/or detectors, for example. Some embodiments may be capable of simultaneously projecting more than one beam of coherent light. Such embodiments may be able to rapidly map a surface topography. Processor(s) 82, in one example, is configured to implement functionality and/or process instructions for execution within LIDAR system 70. For instance, processor(s) 82 can be capable of processing instructions stored in memory 84. Examples of processor(s) 82 can include any one or more of a microprocessor, a controller, a digital signal processor (DSP), an application specific integrated circuit (ASIC), a field-programmable gate array (FPGA), or other equivalent discrete or integrated logic circuitry.

In some embodiments, optical components 74 and 78 and/or opto-electrical components 72, 76 and 80 can be manufactured as an integrated photonics device. For example, exemplary phase modulators 64 may include waveguides that have electronically controllable refractive indices. The refractive indices of some such waveguides can be controlled by changing the carrier concentration within the waveguides. Phase modulation control can also be performed by controlling the frequency of coherent light and passing that light through a grating structure, for example. Similarly, various types of structures can be used for other opto-electrical components 72, 76 and 80 and optical components 74 and 78. For example, a single photodetector 80 can be used in conjunction with a focal plane array that is in communication with processor(2) 82 via Input/Output Interface 86. In some embodiments, a quadrature detector can be used for detecting both signal intensity and directionality of signals. In an exemplary embodiment, a two-dimensional array of photonic receivers can be used with phase relations between the photonic receivers controlled so as to make the two-dimensional array of photonic receivers sensitive to optical beams along specific angles with respect to the optical axis. The two-dimensional array of photonic receivers provides a combined signal detectable by a photodetector. Such integrated photonics devices can provide optical beam steering functions using non-mechanical means as described above. Such beam steering can be used in beam generation and/or in beam detection. In some embodiments, use of such integrated photonic devices can advantageously be used in high acceleration applications, such as artillery ballistic ordnances.

Processor(s) 82 interfaces with both opto-electrical elements 72, 76 and 80 and electronic components 84 and 86. In some embodiments, processor(s) 82 may perform some or all of the operations associated with LIDAR system 70. Such operations may include detection of pulses of coherent light from a signal generated by photodetector 80, calculating time differences between emitted pulses of coherent light by laser 72 and detected pulses of coherent light by photodetector 80, coordinating phase modulators 76 so as to steer an optical beam of coherent light at a specific angle with respect to an optical axis, and generating a topographical map of ground surface 20. In some embodiments, processor(s) 82 may perform image processing algorithms on topographical map 38 generated by LIDAR system 70. For example, processor(s) 82 may compare image features of generated topographical map 38 with image features associated with a predetermined target. Processor(s) 82 may also identify pixel coordinates corresponding to image features of topographical map 38 that are found to match and/or correspond to image features of the predetermined target.

Memory 84 can be configured to store information within LIDAR system 70 during operation. Memory 84, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 84 is a temporary memory, meaning that a primary purpose of memory 84 is not long-term storage. Memory 84, in some examples, is described as volatile memory, meaning that memory 84 does not maintain stored contents when power to LIDAR system 70 is turned off. Examples of volatile memories can include random access memories (RAM), dynamic random access memories (DRAM), static random access memories (SRAM), and other forms of volatile memories. In some examples, memory 84 is used to store program instructions for execution by processor(s) 82. Memory 84, in one example, is used by software or applications running on LIDAR system 70 (e.g., a software program implementing designated target detection) to temporarily store information during program execution.

Memory 84, in some examples, also includes one or more computer-readable storage media. Memory 84 can be configured to store larger amounts of information than volatile memory. Memory 84 can further be configured for long-term storage of information. In some examples, memory 84 includes non-volatile storage elements. Examples of such non-volatile storage elements can include magnetic hard discs, optical discs, flash memories, or forms of electrically programmable memories (EPROM) or electrically erasable and programmable (EEPROM) memories. Memory 84 can include program segments, pulse detector segments, pattern sequence recognition segments, and image processing segments, etc.

LIDAR system 70 also includes input/output interface 86. In some embodiments, input/output interface 86 can utilize communications modules to communicate with external devices via one or more networks, such as one or more wireless or wired networks or both. Input/output interface 86 can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB).

In some embodiments, input/output interface 86 can be used to facilitate communications between LIDAR system 70 and an ordnance guidance system. For example, an ordnance can be equipped with airflow control surfaces so as to provide control of a trajectory. Such ordnances can have their trajectories controlled so as to minimize a target miss distance, or to provide for a desired ordnance impact angle with the ground surface and/or target. In some embodiments, the ordnance can have a fixed pre-specified explosion pattern. The mapped ground topography provided by LIDAR system 70 can be communicated to the ordnances so that the impact angle is optimized and/or the target miss distance is minimized, for example. In some embodiments, the ordnance guidance system can control ordnance's trajectory based on data provided by LIDAR system 70 in addition to data provided by inertial measurement systems, such as, for example, gyroscopes, etc.

Figure 4:
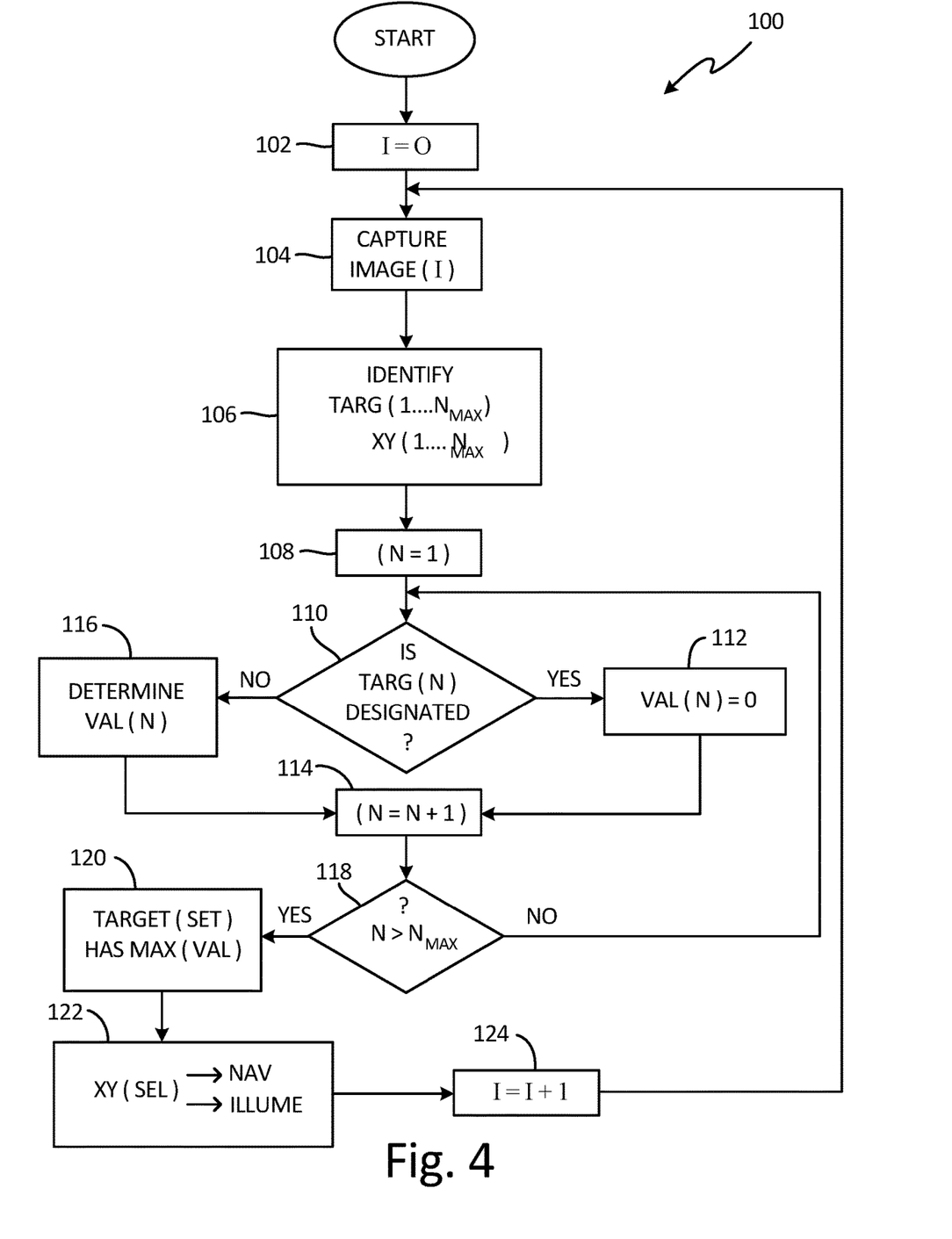
FIG. 4 depicts a flowchart of an exemplary method for facilitating communications between two or more laser-guided missiles.

FIG. 4 depicts a flowchart of an exemplary method for facilitating communications between two or more laser-guided missiles. In FIG. 4, method 100 is shown from the perspective of processor(s) 82 (depicted in FIG. 3) as acting as the controller for an exemplary seeker having inter-missile communications capability. Method 100 begins at step 102, where processor(s) 82 initializes index I to zero. Then at step 104, processor(s) 82 controls the capture of image(I) by an optical imager (e.g., a focal plane array). Then at step 106, processor(s) 82 a number of portions of the captured image that correspond to potential targets—in this case $N_{MAX}(I)$ separate portions. The pixel coordinates $XY(1 \ldots N_{MAX})$ of each of these portions of the captured image are stored, as are the types $TARG(1 \ldots N_{MAX})$ of the potential targets identified (e.g., tank, truck, etc.).

Method 100 proceeds to step 108, where processor(s) 82 initializes the index N to one. Then, at step 110, processor(s) 82 determines whether if TARG(N) has been designated by a seeker of another missile. If, at step 110, processor(s) 82 determines that TARG(N) has been designated by a seeker of another missile, then the method proceeds to step 112 where processor(s) 82 sets the value VAL(N) corresponding to the potential target located at XY(N) to zero. Then the method proceeds to step 114 where processor(s) 82 increments index N. If, however, at step 110, processor(s) 82 determines that TARG(N) has not been designated by a seeker of another missile, then the method proceeds to step 116 where processor(s) 82 assigns the value VAL(N) associated with the type of TARG(N). Then the method proceeds to step 114 where processor(s) 82 increments index N.

Method 100 proceeds to step 118 where processor(s) 82 compares index N with the number $N_{MAX}$ of potential targets identified in the captured image. If N is not greater than NMAX, then the method returns to step 110 where the processor(s) determines if the next potential target identified in the captured image has been designated. If, however, N is greater than NMAX, then each of the $N_{MAX}$ targets found in the captured image have been assigned a value VAL(N), and the method proceeds to step 120. At step 120, processor(s) 82 selects the target SEL corresponding to the potential target given the highest value (e.g., VAL(SEL)>= $VAL(1 \ldots N_{MAX})$). Method 100 proceeds to step 122 where processor(s) sends coordinates XY(SEL) to a GNC module and a target designation controller ILLUME. Method 100 proceeds to step 124, where image frame index I is incremented, and method 100 returns to step 104 where the next image in a time-sequence of images is captured.

Figure 5:
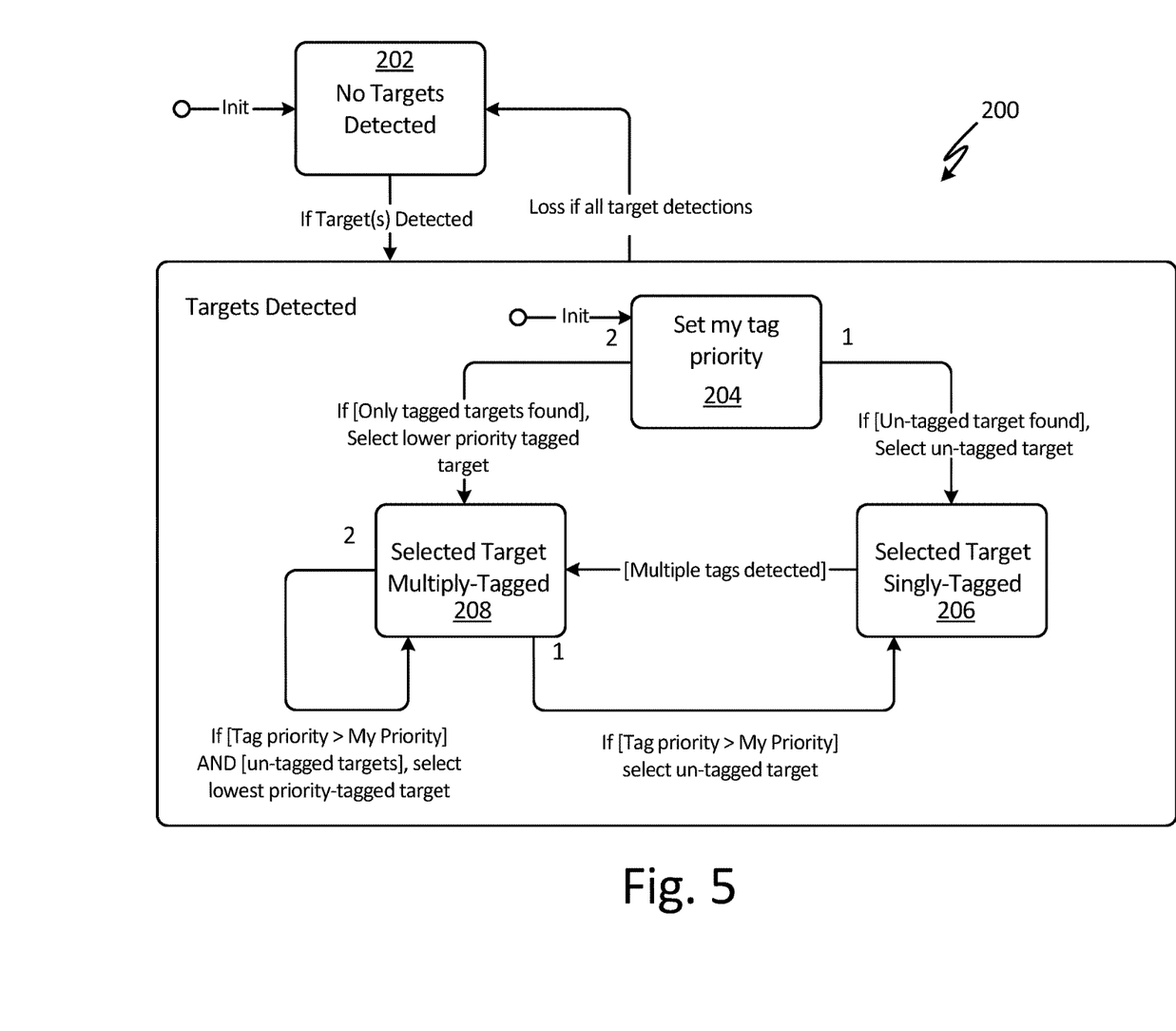
FIG. 5 depicts a state machine of an exemplary control system for a missile target selector.

FIG. 5 depicts a state machine of an exemplary control system for a missile target selector. In FIG. 5, method 200 is shown from the perspective of processor(s) 82 (depicted in FIG. 3) as acting as the controller for an exemplary seeker having inter-missile communications capability. Method 200 is an alternate embodiment, different from method 100 in that method 200 employs consideration of priority tags. Method 200 begins by microprocessor(s) 82 initializing the number of detected targets to zero resulting in state 202. Then, if a target is detected, microprocessor(s) 82 initializes the priority tag of the missile resulting in state 204. If untagged targets are detected, then microprocessor(s) 82 select one (e.g., the most valuable one) of the untagged detected targets resulting in state 206. If another missile tags the selected target, then method 200 enters state 208. If the detected tag priority of the other missile is greater than then the tag priority of the missile controlled by the method and there are still other untagged targets detected, then microprocessor(s) 82 selects the one of the untagged detected targets resulting in a return to state 206. If, however, at state 208, the detected tag priority of the other missile is greater than then the tag priority of the missile controlled by the method and there are no other untagged targets detected, then microprocessor(s) 82 selects the target with the lowest tag priority and remains in state 208. If, back at state 204, only tagged targets are detected, then method 200 enters state 208. If no targets are detected in states 204, 206 or 208, then method 200 returns to state 202.

The following are non-exclusive descriptions of possible embodiments of the present invention.

Some embodiments relate to a system for facilitating communications between guided missiles. The system includes an optical imaging system configured to generate an image of a scene aligned with a missile axis. the image includes a two-dimensional array of pixel data. The system includes a controller having a target identifier configured to identify one or more image portions within the image as corresponding to one or more potential targets in the aligned scene. The controller also has a target selector configure to select one of the one or more identified image portions. The selected one of the one or more identified image portions corresponds to a selected target within the aligned scene. The system includes an optical emitter configured to illuminate the selected target thereby communicating, to other missiles equipped to detect illumination of the target, that the selected target has been designated.

The system of the preceding paragraph can optionally include, additionally and/or alternatively, any one or more of the following features, configurations and/or additional components:

A further embodiment of the foregoing system, wherein the controller can further includes a Guidance, Navigation and Control (GNC) module. The GNC module can be configured to determine a direction of the selected target relative to the missile axis. The GNC module can be further configured to generate an output signal indicative of the determined direction of the selected target relative to the missile axis.

A further embodiment of any of the foregoing systems, wherein the optical emitter can further includes a laser electrically coupled to the controller. The laser can generate, in response to receiving from the controller a timing signal at an emission time, a pulse of coherent light.

A further embodiment of any of the foregoing systems, wherein the optical imaging system can include an integrated photonics LIDAR system that can have a two-dimensional array of light emitters, each optically coupled to receive a portion of the generated pulse of coherent light from the laser via an optical wave guide, and to emit the received portion of coherent light. The optical imaging system can include a plurality of phase modulators electrically coupled to the controller. The plurality of phase modulators can be configured to coordinate, in response to receiving from the controller a signal indicative of an emission angle, relative phases of the emitted portions of optical light so as to form a beam of light directed at an emission angle relative to the missile axis.

A further embodiment of any of the foregoing systems, wherein the laser can be a Short Wave InfraRed (SWIR) laser.

A further embodiment of any of the foregoing systems, wherein the optical emitter can be further configured to illuminate the selected target using an illumination signal pattern identifying the optical emitter as being the source of the illumination.

A further embodiment of any of the foregoing systems, wherein the controller can further include a designation detector configured to determine a designated subset of the one or more image portions within the image. The designated subset can correspond to one or more potential targets in the aligned scene that have been designated via illumination by other optical emitters.

A further embodiment of any of the foregoing systems, wherein the target selector can be further configured to select one of the one or more identified image portions that is not a member of the designated subset.

A further embodiment of any of the foregoing systems, wherein the target selector can be further configured to select one of the one or more identified image portions that is a member of the designated subset.

A further embodiment of any of the foregoing systems, wherein the optical imaging system includes a focal plane array having an two-dimensional array of pixels that provide the two-dimensional array of pixel data. The optical imaging system can further include an optical lens stack configured to receive light from the aligned scene and configured to focus at least a portion of the received light onto the imaging region of the focal plane array thereby forming an image of the aligned scene, the image comprising pixel data generated by the plurality of pixels.

Some embodiments relate to a seeker for a Semi-Active Laser (SAL) guided missile. The seeker includes a Short-Wave Infra-Red (SWIR) camera. The SWIR camera includes a focal plane array having an imaging region comprising a plurality of pixels. The SWIR camera includes an optical lens stack configured to receive SWIR light from a scene aligned along a missile axis of the optical lens stack. The optical lens stack is further configured to focus at least a portion of the received SWIR light onto the imaging region of the focal plane array thereby forming an image of the aligned scene. The image includes pixel intensity data generated by the plurality of pixels. The seeker includes a controller. The controller includes a target identifier configured to identify one or more image portions within the image as corresponding to one or more potential targets in the aligned scene. The controller includes a designation detector configured to detect illuminations by Laser Target Designators (LTDs) and to associate detected illuminations with potential targets corresponding to identified portions within the image. The controller includes a decoder configured to decode an illumination pattern of the illumination by the LTD. The controller includes a target selector configure to select, based at least in part on the decoded illumination pattern, one of the one or more identified image portions. The selected one of the one or more identified image portions corresponds to a selected target within the aligned scene.

A further embodiment of the foregoing seeker, wherein the target selector can be further configured to select one of the one or more identified image portions that is not associated with illuminations by LTDs.

A further embodiment of any of the foregoing seekers, wherein the target selector can be further configured to select one of the one or more identified image portions that is associated with illuminations by LTDs.

A further embodiment of any of the foregoing seekers, wherein the controller further includes a Guidance, Navigation and Control (GNC) module configured to determine a direction of the selected target relative to the missile axis. The GNC module can be further configured to generate an output signal indicative of the determined direction of the selected target relative to the missile axis.

A further embodiment of any of the foregoing seekers, wherein the GNC module is further configured to chart a navigation path calculated to arrive at the selected target at a time coordinated by information of the decoded illumination pattern.

Some embodiments relate to a method for facilitating communications between guided missiles. The method includes capturing an image of a scene aligned with a missile axis. The method includes identifying one or more image portions within the captured image, the identified one or more image portions corresponding to one or more potential targets in the aligned scene. The method includes selecting one of the one or more identified image portions, the selected one of the one or more identified image portions corresponding to a selected target within the aligned scene. Thee method also includes illuminating the selected target thereby communicating, to other missiles equipped to detect the target illumination, that the selected target has been designated.

The method of the preceding paragraph can optionally include, additionally and/or alternatively, any one or more of the following features, configurations and/or additional components:

A further embodiment of the foregoing method, further including determining a direction of the selected target relative to the missile axis. The method can further include generating an output signal indicative of the determined direction of the selected target relative to the missile axis.

A further embodiment of any of the foregoing methods, further including determining a designated subset of the one or more image portions within the image, the designated subset corresponding to one or more potential targets in the aligned scene that have been designated via illumination by other optical emitters.

A further embodiment of any of the foregoing methods, further including selecting one of the one or more identified image portions that is not a member of the designated subset.

A further embodiment of any of the foregoing methods, further including selecting one of the one or more identified image portions that is a member of the designated subset.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system configured to be mounted to a guided missile and to facilitate communications between the guided missile and other systems mounted to other guided missiles, the system comprising:
   an optical imaging system configured to generate an image of a scene aligned with a missile axis of the guided missile, the image comprising a two-dimensional array of pixel data;
   a controller including:
      a target identifier configured to identify a plurality of image portions within the image as corresponding to a plurality of potential targets in the aligned scene; a designation detector configured to determine a designated subset of the plurality of image portions within the image, the designated subset corresponding to potential targets in the aligned scene that have been designated via illumination by other optical emitters of the other systems mounted to the other guided missiles; and
      a target selector configured to select, if at least one of the plurality of identified image portions is not a member of the designated subset, a target corresponding to one of the plurality of identified image portions that is not a member of the designated subset; and
   an optical emitter configured to illuminate the selected target thereby communicating, to other missiles equipped to detect illumination of the target, that the selected target has been designated.

2. The system of claim 1, wherein the controller further includes:
   a Guidance, Navigation and Control (GNC) module configured to:
      determine a direction of the selected target relative to the missile axis; and
      generate an output signal indicative of the determined direction of the selected target relative to the missile axis.

3. The system of claim 1, wherein the optical emitter further includes:
   a laser electrically coupled to the controller, the laser generating, in response to receiving from the controller a timing signal at an emission time, a pulse of coherent light.

4. The system of claim 3, wherein the optical imaging system comprises:
   an integrated photonics LIDAR system including:
      a two-dimensional array of light emitters, each optically coupled to receive a portion of the generated pulse of coherent light from the laser via an optical wave guide, and to emit the received portion of coherent light; and
      a plurality of phase modulators electrically coupled to the controller, the plurality of phase modulators configured to coordinate, in response to receiving from the controller a signal indicative of an emission angle, relative phases of the emitted portions of optical light so as to form a beam of light directed at an emission angle relative to the missile axis.

5. The system of claim 3, wherein the laser is a Short Wave InfraRed (SWIR) laser.

6. The system of claim 1, wherein the optical emitter is further configured to illuminate the selected target using an illumination signal pattern identifying the optical emitter as being the source of the illumination.

7. The system of claim 1, wherein the controller further includes:
   a target evaluator configured to determine a target value of the plurality of potential targets corresponding to the plurality of image portions within the image.

8. The system of claim 7, wherein the selected one of the plurality of identified image portions that is not a member of the designated subset corresponds to the potential target of the highest target value amongst targets that are not members of the designated subset, as determined by the target evaluator.

9. The system of claim 7, wherein the target selector is further configured to:
select, if all of the plurality of identified image portions are members of the designated subset, one of the plurality of identified image portions that is a member of the designated subset.

10. The system of claim 1, wherein the optical imaging system comprises:
a focal plane array having an two-dimensional array of pixels that provide the two-dimensional array of pixel data; and
an optical lens stack configured to receive light from the aligned scene and configured to focus at least a portion of the received light onto the imaging region of the focal plane array thereby forming an image of the aligned scene, the image comprising pixel data generated by the plurality of pixels.

11. A seeker for a Semi-Active Laser (SAL) guided missile, the seeker comprising:
a Short-Wave Infra-Red (SWIR) camera comprising:
a focal plane array having an imaging region comprising a two-dimensional array of pixels; and
an optical lens stack configured to receive SWIR light from a scene aligned along a missile axis of the optical lens stack and further configured to focus at least a portion of the received SWIR light onto the imaging region of the focal plane array thereby forming an image of the aligned scene, the image comprising pixel intensity data generated by the two-dimensional array of pixels; and
a controller comprising:
a target identifier configured to identify a plurality of image portions within the image as corresponding to a plurality of potential targets in the aligned scene;
a designation detector configured to detect illuminations by Laser Target Designators (LTDs) and to associate detected illuminations with potential targets corresponding to identified portions within the image; and
a target selector configured to select, if at least one of the plurality of potential targets is not associated with detected illuminations, at least one of the plurality of potential targets that is not associated with detected illuminations as determined by the designation detector.

12. The seeker of claim 11, further comprising:
a target evaluator configured to determine a target value of the plurality of potential targets,
wherein the selected one of the plurality of potential targets-corresponds to the potential target of the highest target value amongst targets that are not associated with detected illuminations, as determined by the target evaluator.

13. The seeker of claim 11, wherein the target selector is further configured to:
select, if all of the plurality of potential targets are associated with detected illuminations, one of the plurality of potential targets.

14. The seeker of claim 11, wherein the controller further comprises:
a Guidance, Navigation and Control (GNC) module configured to:
determine a direction of the selected target relative to the missile axis; and
generate an output signal indicative of the determined direction of the selected target relative to the missile axis.

15. The seeker of claim 14, wherein the GNC module is further configured to:
chart a navigation path calculated to arrive at the selected target at a time coordinated by information of the decoded illumination pattern.

16. A method for facilitating communications between guided missiles, the method comprising:
capturing an image of a scene aligned with a missile axis;
identifying a plurality of image portions within the captured image, the identified plurality of image portions corresponding to a plurality of potential targets in the aligned scene;
determining a designated subset of the plurality of image portions within the image, the designated subset corresponding to potential targets in the aligned scene that have been designated via illumination by other optical emitters;
selecting, if at least one of the plurality of identified image portions is not a member of the designated subset, a selected target corresponding to one of the plurality of identified image portions that is not a member of the designated subset; and
illuminating the selected target thereby communicating, to other missiles equipped to detect the target illumination, that the selected target has been designated.

17. The method of claim 16, further comprising:
determining a direction of the selected target relative to the missile axis; and
generating an output signal indicative of the determined direction of the selected target relative to the missile axis.

18. The method of claim 16, further comprising:
determining a target value of the plurality of potential targets.

19. The method of claim 18, wherein the selected one of the plurality of identified image portions that is not a member of the designated subset corresponds to the potential target of the highest target value amongst targets that are not members of the designated subset.

20. The method of claim 18, further comprising:
selecting, if all of the plurality of identified image portions are members of the designated subset, one of the plurality of identified image portions that is a member of the designated subset.

* * * * *